United States Patent
Redman

[11] 3,953,850
[45] Apr. 27, 1976

[54] RADAR TEST FACILITY COMMUNICATION SYSTEM

[75] Inventor: Charles M. Redman, Las Cruces, N. Mex.

[73] Assignee: The United States of America as represented by the Secretary of the Army, Washington, D.C.

[22] Filed: Oct. 8, 1974

[21] Appl. No.: 513,019

[52] U.S. Cl. ............................ 343/17.7; 343/6 ND; 343/100 PE
[51] Int. Cl.² .......................................... G01S 7/04
[58] Field of Search.......... 343/17.7, 6 ND, 100 AP; 35/10.4

[56] References Cited
UNITED STATES PATENTS

| | | | |
|---|---|---|---|
| 3,280,243 | 10/1966 | Gregory, Jr. | 35/10.4 |
| 3,291,884 | 12/1966 | Gray | 35/10.4 |
| 3,878,520 | 4/1975 | Wright et al. | 343/100 SA |

Primary Examiner—Richard A. Farley
Assistant Examiner—S. C. Buczinski
Attorney, Agent, or Firm—Nathan Edelberg; Robert P. Gibson; Saul Elbaum

[57] ABSTRACT

In a radar test facility, a system for communicating between a radar target generator which produces complex wideband radar data signals simulating static and dynamic targets and an angle simulation test array which comprises a plurality of infrared to microwave transponders. A single frequency traveling wave laser furnishes an infrared or optical source of radiation in a closed loop external to the laser crystal. A plurality of acousto-optic Bragg defractors are positioned in the path of the closed loop for gating the laser radiation out of the loop. Radio frequency simulations of radar signal reflections from such targets as aircrafts, missles, chaff, land, and the like, modulate the gated radiation in frequency and amplitude. Means are also provided for directing the modulated and gated radiation toward the infrared to microwave transponders. Each simulation is directed in angle so as to illuminate that part of the array from which it is desired to have the simulation appear to originate. Separate communication links are utilized for each dynamic aircraft or missile simulation, while one or a plurality of links may be utilized to communicate static simulations of, for example, land, chaff, rain clouds, and the like.

18 Claims, 6 Drawing Figures

RADAR TEST FACILITY COMMUNICATION SYSTEM

RIGHTS OF THE GOVERNMENT

The invention described herein may be manufactured, used, and licensed by or for the United States Government for governmental purposes without the payment to me of any royalty thereon.

BACKGROUND OF THE INVENTION

The present invention is related to a broadband data communication system which utilizes a large number of receiving devices positioned over a large angle of space and, more particularly, to a communication link or links provided between a radar target generator which simulates targets for insertion into radars under test and an angle simulation test array which includes a plurality of infrared-to-microwave transponders.

The complexity of modern air defense weapons is such that the test and evaluation thereof can no longer be satisfactorily performed according to traditional techniques of launching missiles at target drones. A reasonably complete test of a modern air defense weapon by such traditional techniques may, for example, require expenditures in excess of a billion dollars and require 38 years to complete. Naturally, this has led to the development of new techniques and systems which, for example, allow a superior test program to be performed in less than a year and about 2 percent of the cost of field testing.

One such facility is known as a radar test chamber which is housed in a hemispherical building having a radius greater than 100 feet and extending over approximately 140°. The radar equipment under test is positioned at the zero radius point. The curved section of the hemisphere is known as the angle simulation test array and comprises a plurality of infrared-to-microwave transponders. Such transponders receive two or more beams of infrared (IR) energy, focus them onto a nonlinear diode or mixing crystal with nonlinear characteristics where the difference frequency is obtained, and retransmit the difference frequency back in the general direction of the origination of the IR. Basically, the angle simulation test array memorizes the radar antenna pattern, receives the IR transmissions, and retransmits microwave signals inversely in proportion to the memorized radar transmissions and directly in proportion to the amplitude of the IR difference signals and at the frequency of the difference between the two IR signals. The walls of the radar test chamber are preferably covered with RF anechoic material for absorbing the RF energy radiated by the radar under test and the angle simulation test array, the transponders being positioned as desired amongst the anechoic material.

Electronic operation of the radar test chamber is initiated with the test radar sending out a transmission which, for many radars, comprises a high frequency pulse. The frequencies in such a pulse are often too high for most commonly available signal processing equipment such that it must be heterodyned down to a more easily processed frequency or band of frequencies. The heterodyning is accomplished in what is known as a radar target generator which develops an intermediate frequency (IF) of, for example, 1.5±0.25 GHz., buffers it, and splits it into up to 110 signals for the development of up to 100 simulated radar targets, the remaining signals being utilized to develop simulations of terrain clutter, weather effects, and chaff. The computer controlled radar target simulated signals take into account such factors as range delay, Doppler, range attenuation, target signature, scintillation, and the like.

Other weapons testing systems presently in use utilize approximately 250 to 500 transponder elements in the angle simulation test array. The system for communicating with such an array has been direct by means of thousands of radio frequency switches which are controlled by a computer. The 250 to 500 element test facilities are however designed primarily for the testing and evaluation of missiles which inherently have small radar or communication antennas. The problems involved in communicating with the array become much more severe when the test and evaluation of ground based radar is the objective due to their inherently large antennas and very large fields of view. In other words, while 500 array elements may be perfectly suitable for missile testing, some 28,000 array elements are required for radar testing. In the latter instance, direct communication through RF switches is not feasible inasmuch as millions of such computer controlled switches would be required.

OBJECTS AND SUMMARY OF THE INVENTION

A primary object of the present invention is to provide a communication system for use in a radar test facility which isolates the radar from the outside world and is capable of simulating a large number of aircraft and missles, ground clutter, rain clouds, dust clouds, microwave chaff clouds, and electronic counter measures.

Another object of the present invention is to provide a communication system for a radar test facility which utilizes broad band IR directional data links to communicate simulated radar signals from a radar target generator to a plurality of infrared to microwave transponders.

A further object of the present invention is to provide in a radar test facility a communication system which allows full threat testing of modern surface-to-air weapons systems.

A still additional object of the present invention is to provide in a radar test facility a system for communicating between a radar target generator and an array of approximately 28,000 infrared-to-microwave transponders without requiring the use of computer controlled RF switches.

The foregoing and other objects are attained in accordance with one aspect of the present invention through the provision of a communication system for use in a radar test facility which provides an infrared/optical link between a radar target generator and an angle simulation test array. A differential phase shift in a closed path around a laser crystal or gas tube is utilized to create a very narrow band, single direction, continuous wave laser signal. Acousto-optic modulators or gates are inserted in the closed path for gating out IR signals on command and for offsetting the frequency of the laser signal by very specific amounts. Simulations of radar reflections as generated by a radar target generator are utilized as the gating signals for the IR gates, or may be utilized in follow-on acousto-optic modulators to insert the simulations directly on IR beams. IR beams of approximately one solid angle degree carrying the dynamic target simulations are directed by galvanometer mirrors or the like toward a very large array of infrared-to-microwave transponders where the target signals are extracted and reradiated back toward the directing devices. The radar system under test is positioned in close proximity to the IR directors so as to be illuminated by the target signals at the RF or microwave frequencies. A wide angle system is also provided to carry static-type radar target simulation data to the transponder array.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

Figure 1:
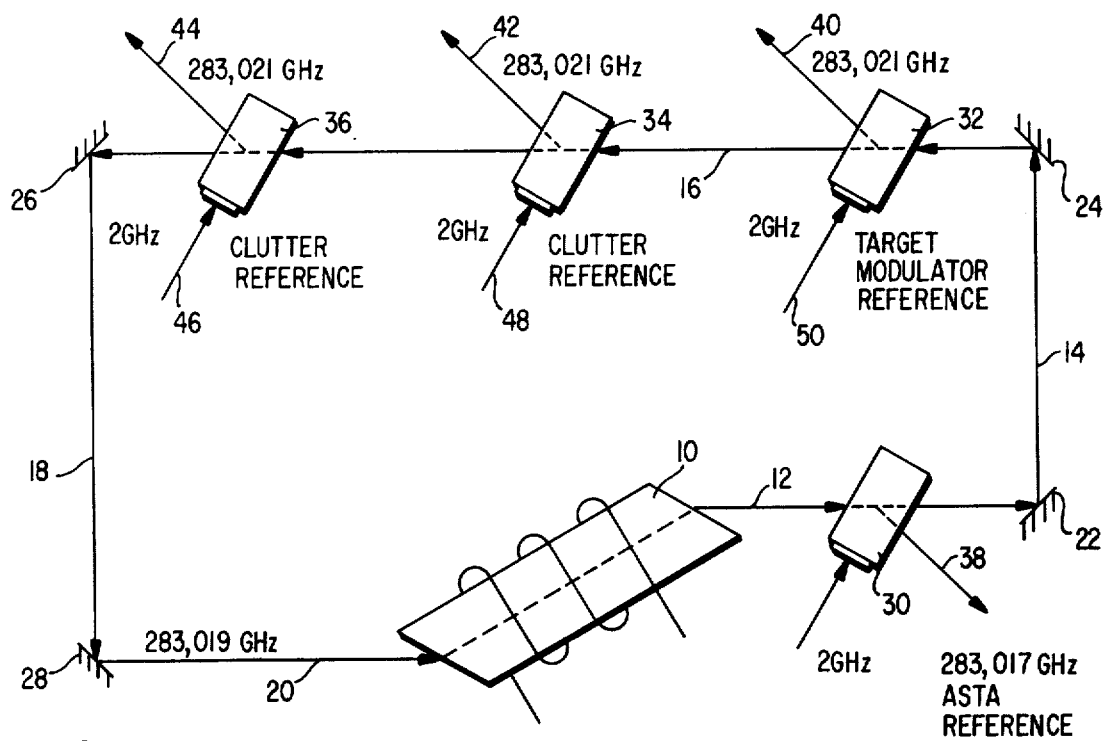
FIG. 1 is a schematic representation of a preferred embodiment according to the present invention.

Referring first to FIG. 1, there is shown a diagrammatic view of a single-frequency traveling wave laser 10 having four acousto-optic modulators 30, 32, 34 and 36 positioned in the beam path for gating out reference IR signals at computer selected times, levels and frequencies. Throughout this specification, the term "IR" is utilized to denote electromagnetic radiation having a wavelength ranging from 0.5 to 15 microns. The preferred embodiment depicted in FIG. 1 utilizes as an example a YAG laser 10 operating at a frequency of 283,019 GHz. (1.06 micron wavelength).

The single frequency traveling wave laser 10 differs from routine lasers in that a differential phase shift is inserted which causes phase cancellation in one direction and phase addition in the opposite direction so as to force lasing in one direction only. To accomplish this phase differential, an external feedback loop is provided by means of mirror reflectors 22, 24, 26 and 28. Mirror 22 directs beam 12 emanating from laser 10 toward mirror 24 as beam 14. Mirror 24 directs beam 14 toward mirror 26 as beam 16, while mirror 26 directs beam 16 toward mirror 28 as beam 18. Finally, mirror 28 directs beam 18 back into the other end of laser 10 as beam 20. If the entire counter-clockwise closed loop is made a whole number of wavelengths long, lasing can be accomplished. However, by making the clockwise path-length a multiple of a half wavelength, phase cancellation occurs to prevent lasing. Such a technique, described, for example, in more detail in the Clobes et al. article appearing in Vol. 21, No. 6 of the "Applied Physics Letters," causes lasing in only one direction, increases available power, and narrows the frequency spectrum. Taken in connection with the system depicted in FIG. 1, the pathlength defined by the counterclockwise radiation is made a whole number of wavelengths long, while the clockwise radiation is off by a half wavelength, thereby allowing lasing to occur in the counterclockwise direction only.

A primary function of the communication system depicted in FIG. 1 is to illuminate the angle simulation test array, comprised of a plurality of infrared-to-microwave transponders, with a continuous wave IR reference signal. This IR reference signal, denoted in FIG. 1 by reference numeral 38, must illuminate all of the transponders involved in a specific test scenario, which involves a considerable amount of power. Sample calculations have shown that a 250 watt laser with high amplitude and frequency stability is sufficient to supply all power necessary plus a reserve factor. The laser developing the IR reference signal must also develop the energy for all the radar signals, electronic warfare signals, and ground, weather and chaff signals.

In FIG. 1, a computer controlled 2 GHz. CW signal, for example, is gated to modulator 30 at the time of, or just subsequent to, the radar transmission. It should be noted that the 2 GHz. signal is one half of a 4 GHz. heterodyning signal described hereinafter as exemplary for a C-band radar. The deflected IR signal 38 emanating from reference modulator 30 is offset in frequency from the undeflected signal 14 by $-2$ GHz. The undeflected signal 14 proceeds through a target modulator reference 32 and a pair of clutter reference acousto-optic modulators 34 and 36. Modulators 32, 34 and 36 are configured to add 2 GHz. to the undeflected IR signal 16. The output signal 40 from target modulator 32 is distributed to, for example, up to 100 target communication acousto-optic modulators, to be described in more detail in connection with FIG. 3 below. Each of the clutter reference modulators 34 and 36 gate the IR signal 16 to a specific clutter communication system, also described in more detail hereinafter.

Figure 3:
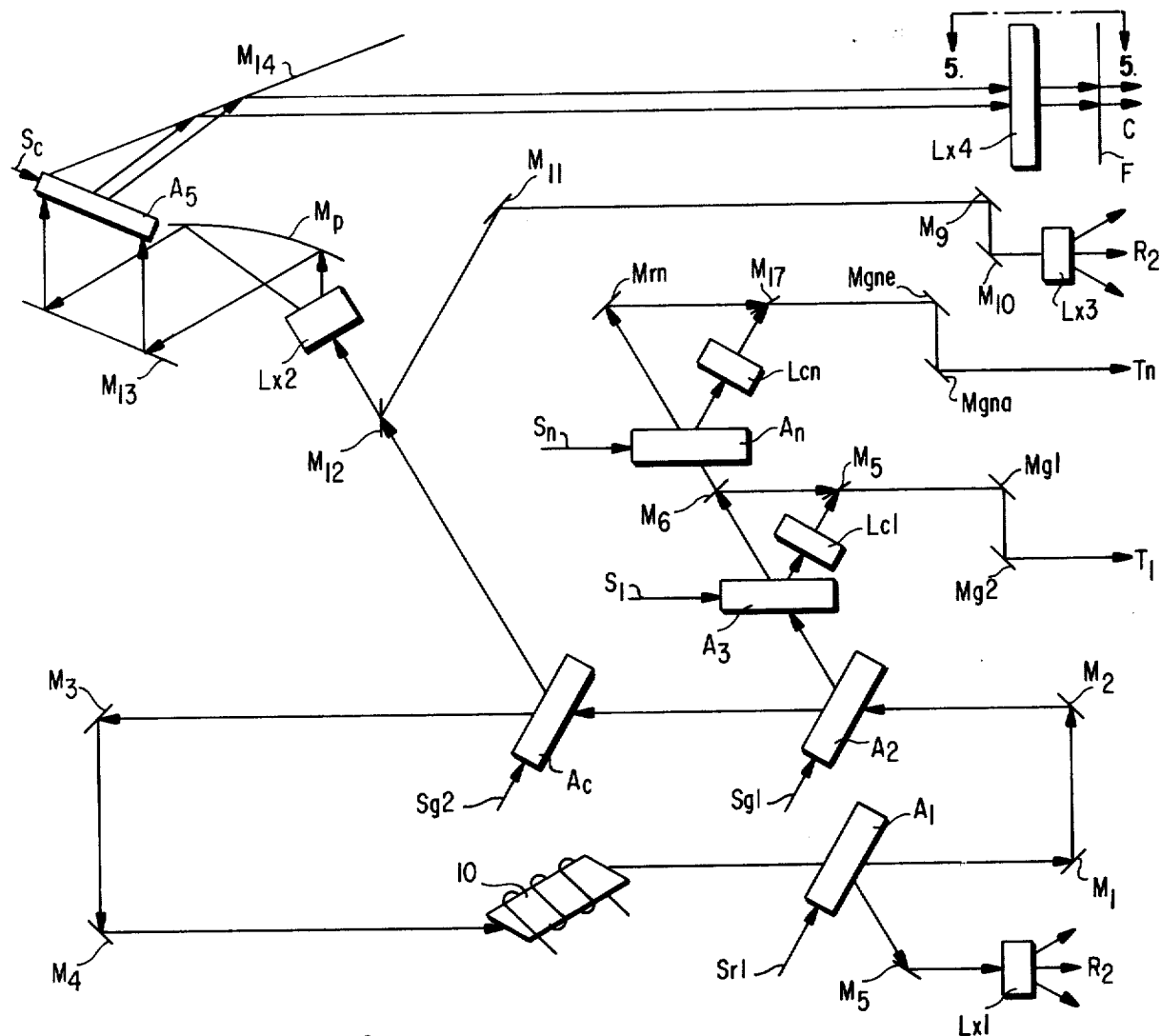
FIG. 3 is a schematic representation of an overall communication system according to a preferred embodiment of the present invention.

Referring now to FIG. 3, the system concept according to the present invention is illustrated wherein a single frequency traveling wave laser 10 forms a closed feedback loop by means of reflecting mirrors $M_1$, $M_2$, $M_3$ and $M_4$. Disposed within the path of the radiation beam generated by laser 10 are three acousto-optic modulatorss $A_1$, $A_2$, and $A_c$. Acousto-optic modulator $A_1$ gates out a primary reference signal $R_1$ which is spread in angle to illuminate the entire transponder array. Signal $S_{rl}$ is computer controlled to gate modulator $A_1$ so as to gate forward the reference signal $R_1$ and furnish the required power level to the array while minimizing the drain on laser 10. The reference signal $R_1$ is reflected from mirror $M_5$ and is expanded by a beam expander $L_{xl}$ is both azimuth and elevation to suitably illuminate the entire array.

Gate $A_2$ is computer controlled by means of signal Sgl to furnish sufficient power for dynamic target simulations $S_1$ through $S_n$. As stated hereinabove, as many as 100 such simulations may be provided. Part of the signal gated by modulator $A_2$ is utilized by gate $A_3$, part passes through gate $A_2$ to be used as a secondary reference, and part is used by gates $A_4$ through $A_n$ for dynamic target simulations $S_2$ through $S_n$. Gate $A_3$ gates target simulation signal $S_1$ through a collimator $L_{cl}$ to a partial mirror $M_5$ where a part of the signal is lost and part is directed to an elevation pointing galvanometer mirror $M_{yt}$ and an azimuth pointing galvanometer mirror $M_{y2}$. The output signal $T_1$ requires very little laser power since it typically operates only when a target simulation pulse is required which may occur, for example, only 1 out of 1,000 microseconds.

Some of the radiation passing undeflected through gate $A_3$ is redirected by a partial mirror $M_6$ through partial mirror $M_5$ so as to be coaxial with the target simulation radiation gated through gate $A_3$ by signal $S_1$. These two signals will then be coaxial to galvanometer mirrors $M_{y1}$ and $M_{y2}$ to the transponder array. The remaining gates $A_4$ through $A_n$ and associated gating signals ($S_2$ through $S_n$), collimating lenses, and mirrors operate similarly to the foregoing. For the sake of brevity and clarity, FIG. 3 illustrates only two such subsystems ($S_1$, $A_3$ and $S_n$, $A_n$), and it is understood that many similar subsystems may be interposed therebetween.

Signal $S_1$ is a microwave simulation of a dynamic target as developed by the radar target generator, such that signal $T_1$ comprises an IR simulation of the dynamic target with the secondary reference. Utilizing C-band radar as an example, signal $S_1$ may be 1.5 GHz. ± 0.25 GHz. thereby causing the $T_1$ target signal to be that amount higher in frequency than the $T_1$ reference signal. Gating signal $S_{g1}$ may typically be 2 GHz., thereby causing the $T_1$ secondary reference signal to be 2 GHz. higher than the laser signal. Signal $S_{r1}$ may also be 2 GHz.; however, since gate $A_1$ is reverse driven with respect to gate $A_2$, the IR output of gate $A_1$ would be 2 GHz. less than the laser frequency, as described above in connection with FIG. 1. The transponder array would accordingly be illuminated with the laser frequency signal minus 2 GHz. (primary reference signal $R_1$), plus 2 GHz. (secondary reference signal $T_1$), and the plus 1.5±0.25 GHz. target signal. These signals are heterodyned in the array transponders to develop signals of 4 GHz. and 1.5±0.25 GHz., and are then reheterodyned to develop 5.5±0.25 GHz. signals. The double heterodyning is required only due to the frequency limitations in state of the art detectors. Obviously, a higher frequency detector would obviate the necessity of the secondary reference signal. While described in connection with a C-band radar, it should be understood by a person of ordinary skill in the art that S-band or L-band radars would be equally useful and further would require only one state of heterodyning with state of the art detectors.

Clutter simulation communication is somewhat more complex that the above-described dynamic target simulation communication. Computer controlled signal $S_{g2}$ controls gate $A_c$ so as to furnish sufficient clutter communication laser power while at the same time minimizing the drain on laser 10. The deflected signal from gate $A_c$ is directed by means of a partial mirror $M_{12}$ and full mirrors $M_{11}$, $M_9$, and $M_{10}$, along with a beam expander $L_{r3}$, as a clutter reference signal $R_2$ toward the transponder array. Clutter reference signal $R_2$ is the secondary reference for the clutter communication link and may typically be the same as the dynamic target references and, in fact, may overlap with them. At the expense of more laser power, the secondary references guided coaxially with the dynamic target signals may be deleted, and reference signal $R_2$ directed through beam expander $L_{r3}$ to the entire transponder array. This would simplify the computer operation and obviate the necessity for the mirrors involved in directing the secondary dynamic target reference coaxial with the target signals.

A portion of the laser signal gated by modulator $A_c$ passes through partial mirror $M_{12}$ to a beam expander $L_{r2}$ where it is fanned out or expanded in azimuth angle. A parabolic mirror $M_p$ receives the output form beam expander $L_{r2}$ to collimate the radiation onto a mirror $M_{13}$ which reradiates the ribbon beam onto an acousto-optic gate $A_5$.

Figure 2:
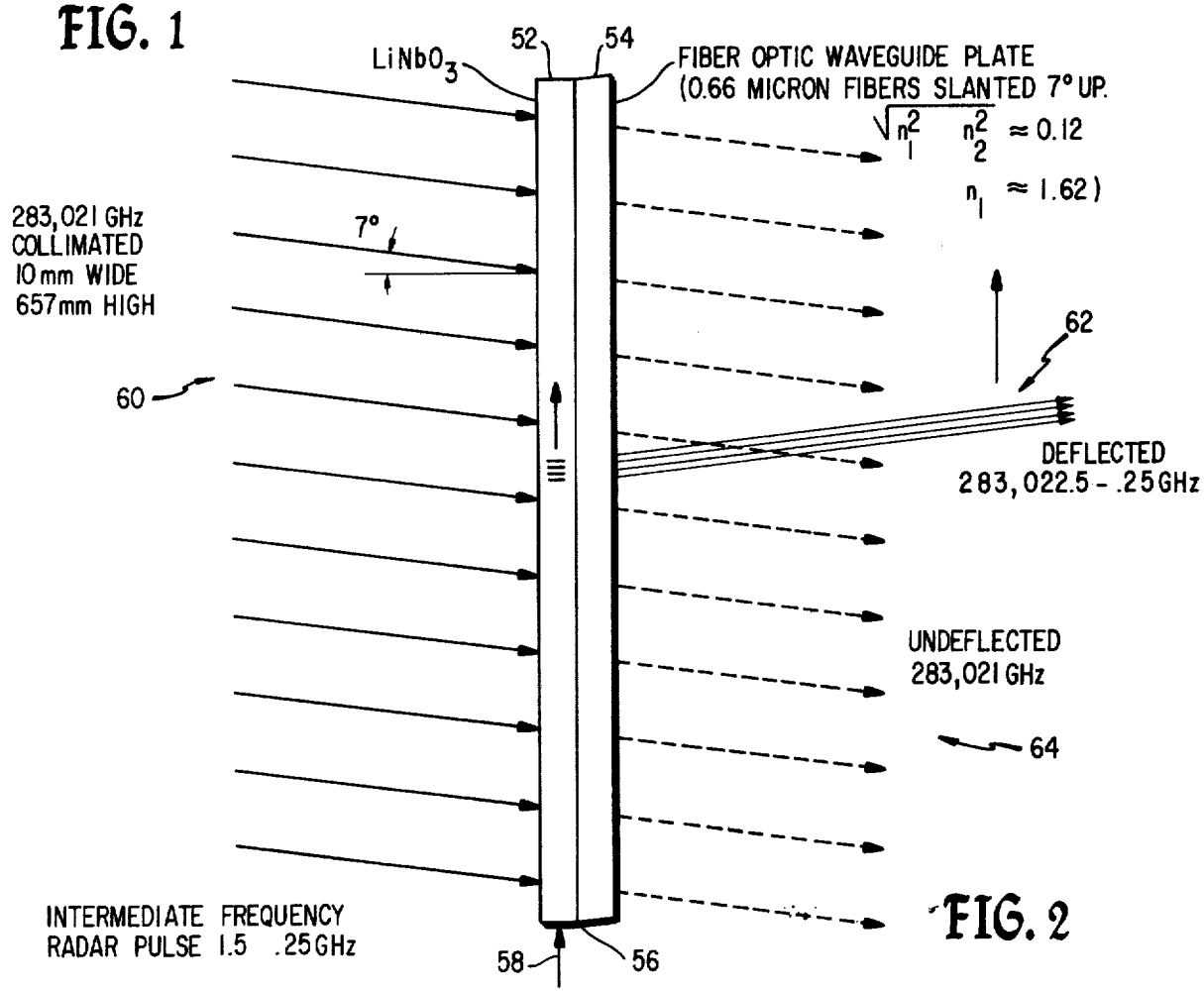
FIG. 2 is a schematic representation of a traveling wave scanner utilized within the context of the present invention for deflecting an IR signal by means of an acoustic signal.

Gate $A_5$ comprises a traveling wave scanner and is shown in more detail in FIG. 2. Referring now to FIG. 2, a lithium niobate crystal 52 is illustrated as having a very small cross section and relatively long length. The collimated single frequency IR energy represented by input beam 60 is deflected or defracted by means of an acoustic signal 58, the latter corresponding to signal $s_c$ of FIG. 3. Attached to the output side of acousto-optic crystal 52 by means of acoustic absorbing transparent cement 56 is a fiber optic waveguide plate 54 which is positioned deep in the near field of the acoustic grating to prevent the variable spacing of the grating from causing an angular wobble in the output beam. As will be apparent to a person of ordinary skill in the art, a fixed grating will perform the same function as the fiber optic waveguide plate 54.

Figure 6:
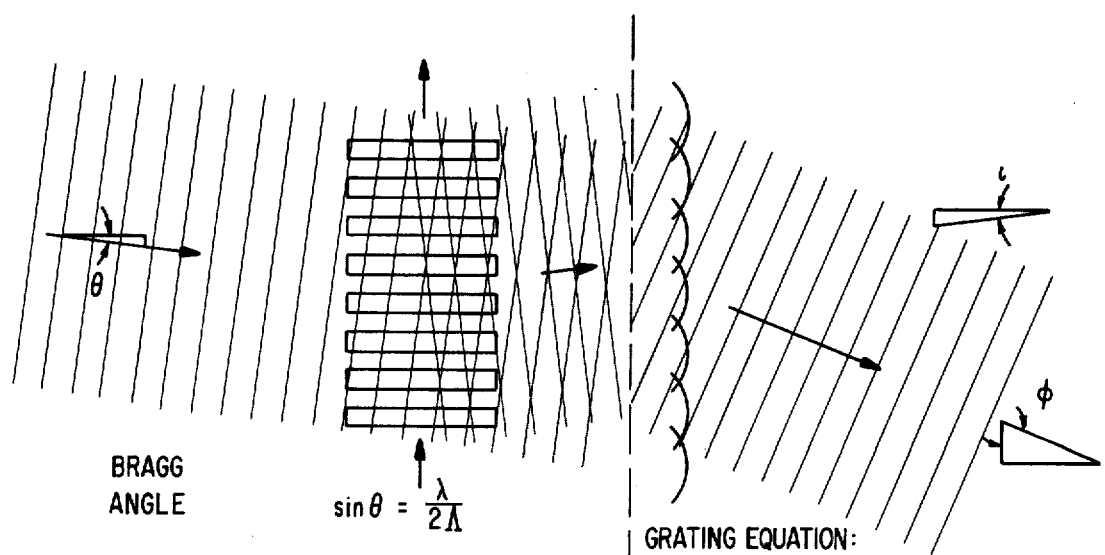
FIG. 6 is a schematic representation illustrating infrared wavefronts as they travel through the traveling wave scanner of FIG. 2.

With no signal 58 present, ribbon beam 60 will pass through crystal 52 undeflected as at 64. If, however, a radar pulse simulation signal 58, typically having a frequency of 1.5 ± 0.25 GHz. and a duration of 1 microsecond, is inserted into one end of crystal 52, it causes a beam 62 to be deflected across the face of the output side of the crystal. As seen in FIG. 3, the radar pulse $S_c$ will cause the output beam from gate $A_5$ to be deflected starting at the leftmost side of gate $A_5$ and progressing toward the right side at a velocity of 6,570 meters per second (the acoustic velocity in lithium niobate). With the crystal illustrated in FIG. 2, such a beam will scan from one end thereof to the other in approximately 100 microseconds. Such a scan represents approximately 15 kilometers of radar range scan. The scanning beam 62 would change somewhat in angle due to the plus or minus 0.25 GHz. signal bandwidth. Such an angular change is objectionable; thus, means are necessary, such as the fiber optic waveguide plate 54, to stabilize the output angle. The waveguide plate 54 unfortunately tends to utilize undue amounts of laser power, and thus the grating shown in FIG. 6 may be utilized for the same purpose. In both cases, the angle corrector must be in the near field of the acoustic grating where the scattered radiation appears to be coming from many points rather than from only one. The acoustic grating reflects the IR radiation at each compression wave. A low level signal $S_c$ (as seen in FIG. 3) causes a low level compression (as seen in FIG. 6) and most of the radiation will pass essentially straight through the crystal 52. Increasing the level of signal $S_c$ will cause more radiation to be deflected. The Bragg angle, as shown in FIG. 6, is that angle of radiation entering the crystal which matches the acoustic grating spacing so as to cause the waves which are deflected by the compressions to line up in a straight line. If the acoustic frequency is changed, the deflections will not line up in the same straighht line and a new radiation angle will be formed in the far field. A fixed grating placed close to the acoustic grating will redirect the radiation before it has defined a new direction. This is based on the path length of the radiation to the fixed grating being essentially constant over the 0.5 GHz. band. The fixed grating then determines the exit direction and therefore will stabilize the beam direction. This same technique may be utilized at the dynamic target signal gates $A_3$ through $A_n$ of FIG. 3; however, since those gates always deflect the radiation from the same point, a simple collimating lens will be sufficient.

Figure 5:
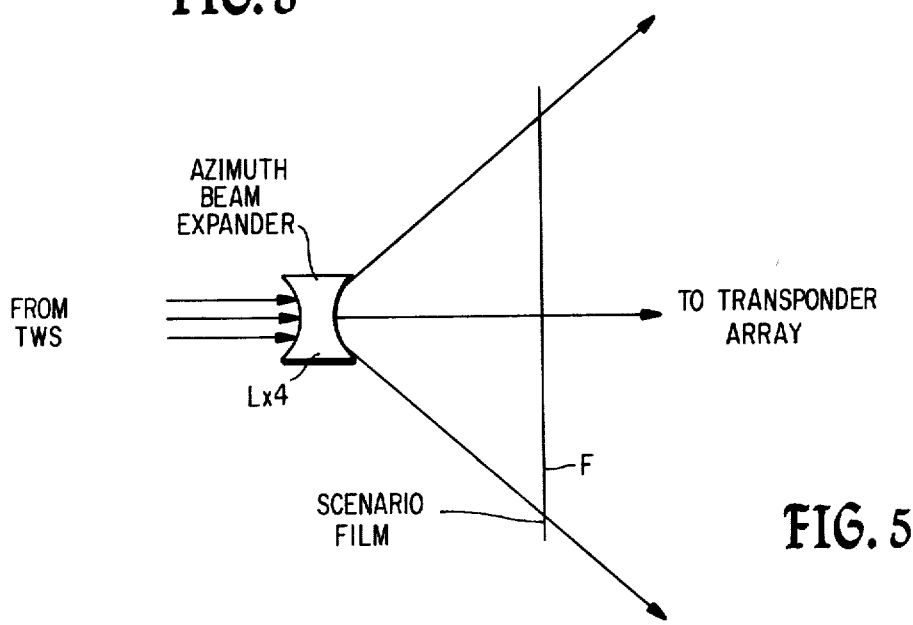
FIG. 5 is a schematic view of certain elements from the systems of FIGS. 3 and 4 taken along lines 5—5 thereof.

Referring again to FIG. 3, the stabilized traveling wave beam output by traveling wave scanner $A_5$ is then deflected by a mirror $M_{14}$, is then expanded in azimuth angle by beam expander $L_{r4}$, and is passed through a scenario film F to the transponder array. FIG. 5 shows beam expander $L_{r4}$ and the scenario film F in more detail. The fanned out beam from beam expander $L_{r4}$ travels up the scenario film F as the acoustic signal $S_c$ travels through traveling wave scanner (TWS) $A_5$. The fan beam is passed through film F whose transparency varies according to the desired scenario. A high degree of transparency simulates a good reflector in direct view of the radar, while opacity simulates a region out of view of the radar, such as that behind a mountain. The attenuated fan beam output from the scenario film radiates the array transponders. Since power handling capabilities of acousto-optic crystals limit the angular coverage, several such clutter communication systems are generally necessary to provide full coverage of the transponder array. It is noted that the progression of the azimuth fan beam up the scenario film F is analogous to a radar radiation pulse traveling across static targets such as the landscape, clouds, and the like. Accordingly, the transponded radiation from the array can be made to appear very much like that of the radar pulse reflections from the static objects in its path. Obviously, by changing the scenario film, new scenarios may be simulated.

Figure 4:
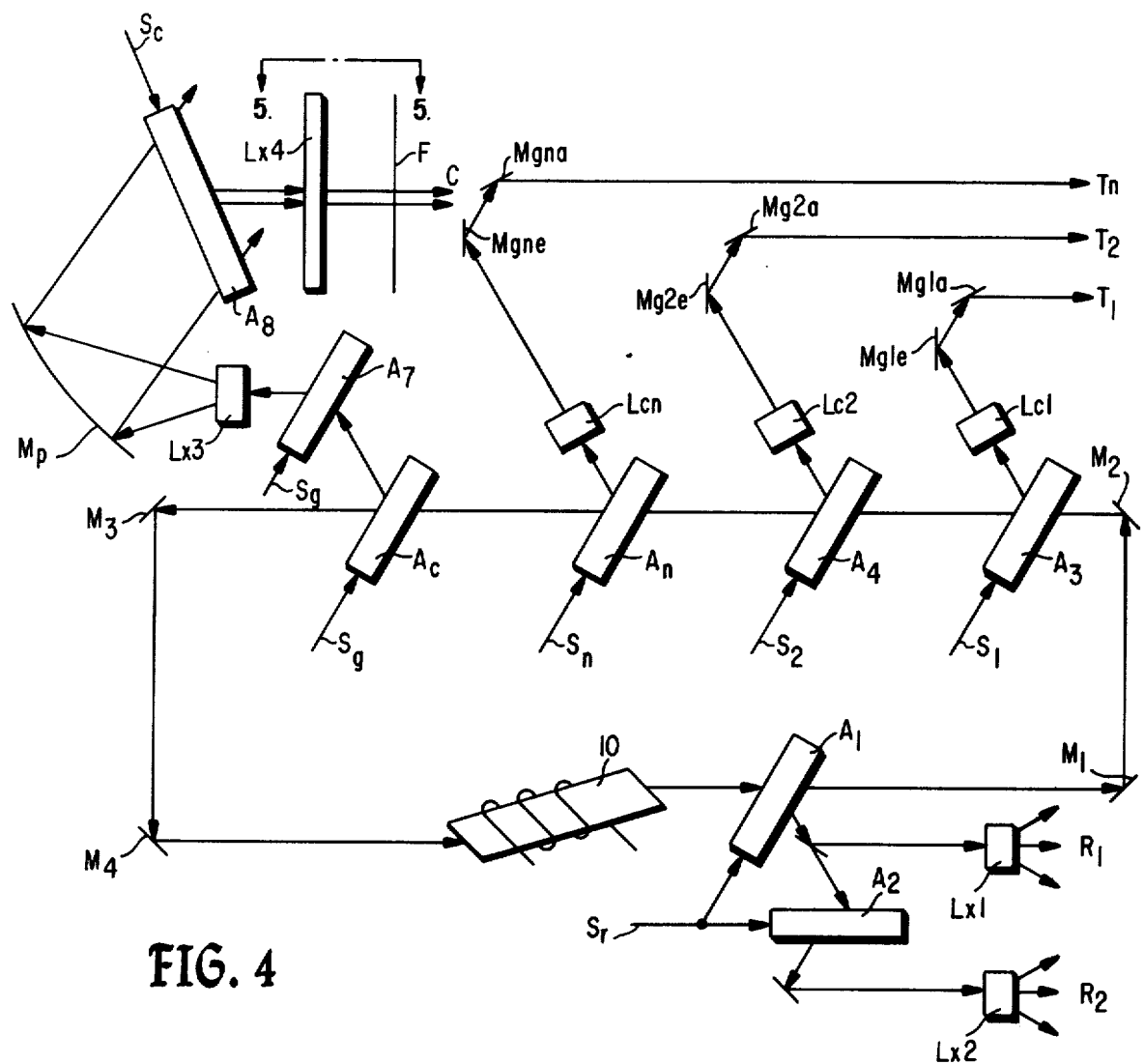
FIG. 4 is a schematic representation of an alternative preferred embodiment of a communication system according to the present invention.

Referring now to FIG. 4, another embodiment of the present invention is illustrated which accomplishes basically the same functions as the first embodiment but wherein reference signals $R_1$ and $R_2$ are developed separately from the static and dynamic target signal systems. It is seen in FIG. 4 that a pair of gates $A_1$ and $A_2$, which are gated by the same computer controlled signal $S_r$, are utilized to develop reference signals $R_1$ and $R_2$, respectively, when then pass through beam expanders $L_{r1}$ and $L_{r2}$, respectively. By way of example, if a control frequency of 2 GHz. is utilized for signal $S_r$, reference signal $R_1$ would be 2 GHz. below the frequency of laser 10, while the frequency of reference signal $R_2$ would be 4 GHz. below the laser frequency. Gates $A_3$, $A_4$, . . . $A_n$, are then provided in the path of the main beam for modulation by dynamic target signals $S_1$, $S_2$, . . . , $S_n$, respectively. The duty time of gates $A_3$ through $A_n$ would typically be less than 1 out of 1,000 micoseconds, such that the loop radiation from the single frequency traveling wave laser 10 would, for the most part, simply pass undeflected through the gates. The radar pulse simulation signals $S_1$, $S_2$, . . . , $S_n$ gate IR pulses which then pass through corresponding collimating lenses $L_{c1}$, $L_{c2}$, . . . , $L_{cn}$. The output IR pulses therefrom are directed by elevation angle galvanometer mirrors $M_{g1e}$, $M_{g2e}$, . . . , $M_{gne}$, and corresponding azimuth angle galvanometer mirrors $M_{g1a}$, $M_{g2a}$, . . . , $M_{gna}$ to the desired area of the transponder array.

The static targets or clutter targets are communicated to the transponder array through a similar technique to that described in connection with the system depicted in FIG. 3. However, in the system of FIG. 4, an extra gate $A_7$ is required. Signal $S_g$ controls gate $A_c$ and adds the frequency of signal $S_g$ to the frequency of the main beam from laser 10. The only function of gate $A_7$ is to subtract the frequency from the output beam of gate $A_c$. Gates $A_c$ and $A_7$ are, therefore, oppositely driven to achieve such end. The frequency of the IR signal gated by gate $A_7$ is the same as the frequency of the signal from laser 10. The beam output from gate $A_7$ is expanded in elevation angle only by a beam expander is then collimated by parabolic mirror $M_p$, and radiates an acousto-optic gate $A_8$. Gate $A_8$ may comprise a traveling wave scanner as previously described in connection with FIGS. 2 and 6. The signal gated from traveling wave scanner $A_8$ is expanded in azimuth angle only by a beam expander $L_{r4}$ and is passed through scenario film F to radiate the desired portion of the transponder array.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. In a radar test facility, a system for communicating between a radar target generator which produces electrical signals that simulate dynamic and static targets for insertion into radars under test and an angle simulation test array which comprises a plurality of infrared to microwave, transponders, which system comprises:
    means for generating IR radiation in a predefined closed path; and
    means disposed in said path for gating said IR radiation towards said test array.

2. The system as set forth in claim 1, wherein said gating means comprises:
    a plurality of acousto-optic modulators which accept as input gating signals thereto said electrical signals from said radar target generator.

3. The system as set forth in claim 2, wherein said acousto-optic modulators include a first modulator for gating out a primary reference signal for said entire array, a second modulator for gating out a secondary reference signal for simulated dynamic targets, and a third modulator for gating out a second secondary reference signal for simulated static targets.

4. The system as set forth in claim 3, further comprising a plurality of dynamic target gating devices adapted to receive said secondary reference signal for gating out a plurality of dynamic target simulated signals in response to a plurality of microwave simulation signals from said radar target generator.

5. The system as set forth in claim 4, further comprising means coupled to receive the outputs from said plurality of dynamic target gating devices for directing said outputs towards preselected ones of said IR to microwave transponders.

6. The system as set forth in claim 3, further comprising:
    means for directing said second secondary reference signal for simulated static targets towards said IR to microwave transponders;
    means for intercepting a portion of said second secondary reference signal;
    means coupled to receive said intercepted portion for expanding same in elevation;
    means for collimating said expanded signal into a flat ribbon beam signal; and an acousto-optic gate illuminated by said flat ribbon beam signal and gated by said static target electrical signal from said radar target generator.

7. The system as set forth in claim 6, further comprising means for expanding the output beam from said acousto-optic gate in azimuth and means for intensity modulating said expanded output beam whereby the output from said intensity modulating means comprises an IR signal analogous to microwave radar signal reflections from natural and manmade static targets.

8. The system as set forth in claim 7, wherein said intensity modulating means comprises a film representative of a particular scenario desired to be simulated.

9. The system as set forth in claim 2, wherein said acousto-optic modulators include a first modulator for gating out a primary reference signal for said entire array, a plurality of dynamic target modulators for gating out a plurality of dynamic target simulated signals, and a first static modulator for gating out a carrier signal for simulated static targets.

10. The system as set forth in claim 9, further comprising a second modulator coupled to receive the output from said first modulator and being responsive to the same gating signal as said first modulator for gating out a secondary reference signal for simulated dynamic targets.

11. The system as set forth in claim 10, further comprising a second static modulator coupled to receive said carrier signal, said second static modulator being oppositely driven by the same electrical simulation signal as said first static modulator.

12. The system as set forth in claim 11, further comprising:
means coupled to receive the output beam from said second static modulator for expanding same in elevation;
means for collimating said expanded output beam into a flat ribbon beam signal; and
an acousto-optic gate illuminated by said flat ribbon beam signal and gated by said static target electrical signal from said radar target generator.

13. The system as set forth in claim 12, further comprising means for expanding the output beam from said acousto-optic gate in azimuth and means for intensity modulating said expanded output beam whereby the output from said intensity modulating means comprises an IR signal analogous to microwave radar signal reflections from natural and manmade static targets.

14. The system as set forth in claim 13, wherein said intensity modulating means comprises a film representative of a particular scenario desired to be simulated.

15. In a radar test system which includes a radar target generator for producing electrical signals that simulate targets and an angle simulation test array which includes a pluality of infrared to microwave transponders, a method of simulating a microwave radar signal moving across static targets, which comprises the steps of:
providing an infrared reference signal;
expanding said reference signal in elevation;
collimating said expanded reference signal into a flat ribbon beam;
illuminating an acousto-optic gate by said flat ribbon beam; and
inserting a microwave radar signal into said gate so as to produce therefrom an angle stabilized infrared beam analogous to said microwave radar signal.

16. The method according to claim 15, further including the steps of:
expanding said angle stabilized infrared beam in azimuth; and
intensity modulating said expanded angle stabilized infrared beam according to a particular scenario desired to be simulated.

17. The system as set forth in claim 1, wherein said generating means comprises a single frequency traveling wave laser which includes means for introducing a differential phase shift along said path whereby lasing occurs in one direction only.

18. The system as set forth in claim 17 wherein said introducing means comprises a feedback loop including means for directing said radiation from one end of said laser back into its other end.

* * * * *